United States Patent [19]

Takeuchi et al.

[11] Patent Number: 5,040,174
[45] Date of Patent: Aug. 13, 1991

[54] TIME DIVISION SPEECH PATH APPARATUS

[75] Inventors: Wataru Takeuchi; Takashi Matsumoto, both of Tokyo, Japan

[73] Assignee: NEC Corporation, Tokyo, Japan

[21] Appl. No.: 562,598

[22] Filed: Aug. 3, 1990

[30] Foreign Application Priority Data

Aug. 11, 1989 [JP] Japan .................................. 1-208238

[51] Int. Cl.$^5$ ........................................... H04Q 11/04
[52] U.S. Cl. .................................... 370/66; 370/58.1; 370/100.1; 370/112; 370/60
[58] Field of Search ............... 370/66, 58.1, 77, 100.1, 370/112, 60

[56] References Cited

U.S. PATENT DOCUMENTS 4,543,652 9/1985 Amada et al. ........................ 370/66
4,941,141 7/1990 Hayano ................................ 370/60

FOREIGN PATENT DOCUMENTS 0024708 3/1981 European Pat. Off. .............. 370/66
0115006 9/1979 Japan .................................... 370/66
0147295 9/1983 Japan .................................... 370/66

OTHER PUBLICATIONS

J. Bellamy, "Digital Telephony", John Wiley & Sons, Inc., 1982, pp. 242-249.

Primary Examiner—Douglas W. Olms
Assistant Examiner—Dang Ton
Attorney, Agent, or Firm—Helfgott & Karas

[57] ABSTRACT

A time division speech path apparatus includes a frame synchronization detector, a pointer detector, a pointer inserting circuit, an address converter, a selector, and a demultiplexer. Pointers are set on highways so that a relationship between the time slots on the highways and read addresses for the speech path control memory is determined on the basis of the frame phases and pointer values of the respective highways. Data which are read out from the speech path control memory in accordance with addresses based on this relationship are written in the speech path memory as read addresses therefor. In addition, sequential addresses generated by the counter operated in accordance with the specific read phase of the system are provided to the speech path memory as read addresses therefor.

1 Claim, 6 Drawing Sheets

SPEECH PATH CONTROL MEMORY (SCM) ADDRESS

MULTIPLEXED HIGHWAY TS NUMBER

| 0 | 1 | 2 | 3 | 4 | 5 | 6 | 7 | 8 | 9 | 10 | 11 |
|---|---|---|---|---|---|---|---|---|---|----|----|
| 8 | 5 | 0 | 7 | 2 | 1 | 10 | 3 | 4 | 9 | 6 | 11 |

FIG.5

| ADDRESS | 0 | 1 | 2 | 3 | 4 | 5 | 6 | 7 | 8 | 9 | 10 | 11 |
|---|---|---|---|---|---|---|---|---|---|---|---|---|
| SPM DATA | FS0 | FS1 | PT0 | PT1 | A | H | G | F | D | B | C | E |
| OUTPUT HIGHWAY NUMBER | 0 | 1 | 0 | 1 | 0 | 1 | 0 | 1 | 0 | 1 | 0 | 1 |
| DATA CODE | FS | FS | PT | PT | CH0 | CH0 | CH1 | CH1 | CH2 | CH2 | CH3 | CH3 |

FIG.7

| INPUT HIGHWAY | | SCM | | OUTPUT HIGHWAY | |
|---|---|---|---|---|---|
| NUMBER | DATA CODE | ADDRESS | DATA | NUMBER | DATA CODE |
| 0 | FS 0 | 0 | 0 | 0 | FS 0 |
| 1 | FS 1 | 1 | 1 | 1 | FS 1 |
| 0 | PT 0 | 2 | 2 | 0 | PT 0 |
| 1 | PT 1 | 3 | 3 | 1 | PT 1 |
| 0 | CH 0 | 4 | 4 | 0 | CH 0 |
| 1 | CH 0 | 5 | 11 | 1 | CH 3 |
| 0 | CH 1 | 6 | 9 | 1 | CH 2 |
| 1 | CH 1 | 7 | 7 | 1 | CH 1 |
| 0 | CH 2 | 8 | 10 | 0 | CH 3 |
| 1 | CH 2 | 9 | 6 | 0 | CH 1 |
| 0 | CH 3 | 10 | 8 | 0 | CH 2 |
| 1 | CH 3 | 11 | 5 | 1 | CH 0 |

FIG.6

TIME DIVISION SPEECH PATH APPARATUS

BACKGROUND OF THE INVENTION

The present invention relates to a time division speech path apparatus of a digital switching system.

In a conventional time division speech path apparatus of a digital switching system, when a plurality of highways having different phases are used as input highways, time division switching is performed in the following manner. A buffer memory is arranged for each input highway. The frame phases of the overall highways are synchronized by performing frame synchronization in such a manner that write operations are performed in accordance with the phases of the input highways, and read operations are performed in accordance with the specific system phase of the speech path. Data from the highways having synchronized frame phases are multiplexed and written in a speech path memory, and data is read out from the speech path memory in accordance with contents read out from a speech path control memory.

In the above-described conventional time division speech path apparatus, since the buffer memories are arranged for the respective input highways, an increase in delay time cannot be avoided. In addition, with an increase in speed of a highway, the required capacity of a buffer memory is increased, resulting in an increase in hardware amount of the system.

SUMMARY OF THE INVENTION

It is an object of the present invention to provide a time division speech path apparatus which can prevent an increase in delay time and hardware amount due to buffer memories.

In order to achieve the above object, according to the present invention, there is provided a time division speech path apparatus, having time division highways having different frame phases as input highways, for performing time division switching between time slots of the input highways and output highways by using a multiplexer for the time division highways, a speech path memory, and a speech path control memory, the time division speech path apparatus comprising a frame synchronization detector for detecting frame positions (highway phases) on data formats of the respective input highways and synchronizing byte phase divisions between the input highways, each of the data formats being constituted by a pointer consisting of at least one byte representing a time slot position at which a first channel of user data on a corresponding one of the time division highways is stored, and a plurality of time slots for carrying a plurality of user data, a pointer detector for holding a difference between a highway phase from the frame synchronization detector and a specific system frame phase of the speech path and a pointer value read out from contents of the pointer of each of the input highways, a pointer inserting circuit for writing pointer values in pointers on the output and input highways, an address converter for converting sequential addresses, which are sequentially generated in accordance with the specific system frame phase, into data on the basis of detected frame phases and pointer values, and outputting the data as addresses for the speech path control memory, a selector for selecting data, which are read out from the speech path control memory by using the outputs from the address converter as addresses, during a write mode of the speech path memory so as to provide the data as addresses to the speech path memory, sequentially writing data obtained by multiplexing data from the input highways in the speech path memory in accordance with the addresses, and selecting sequential addresses, which are sequentially generated by a counter in accordance with a frame phase independent of the specific system frame phase, during a read mode of the speech path memory so as to provide the sequential addresses to the speech path memory as addresses, and a demultiplexer for sequentially reading out contents from the speech path memory, demultiplexing the read contents, and outputting the demultiplexed data to the output highways.

BRIEF DESCRIPTION OF THE DRAWINGS

FIG. 5 is a table showing addresses of a speech path memory and corresponding data stored in a speech path control memory according to the embodiment shown in FIGS. 1 to 4;

FIG. 6 is an address/data table of the speech path control memory which is obtained in relation to FIGS. 1 to 5;

FIG. 7 is a data/address table of the speech path memory which is obtained in relation to FIGS. 1 to 6.

DETAILED DESCRIPTION OF THE PREFERRED EMBODIMENT

The present invention will be described below with reference to the accompanying drawings.

Figure 1:
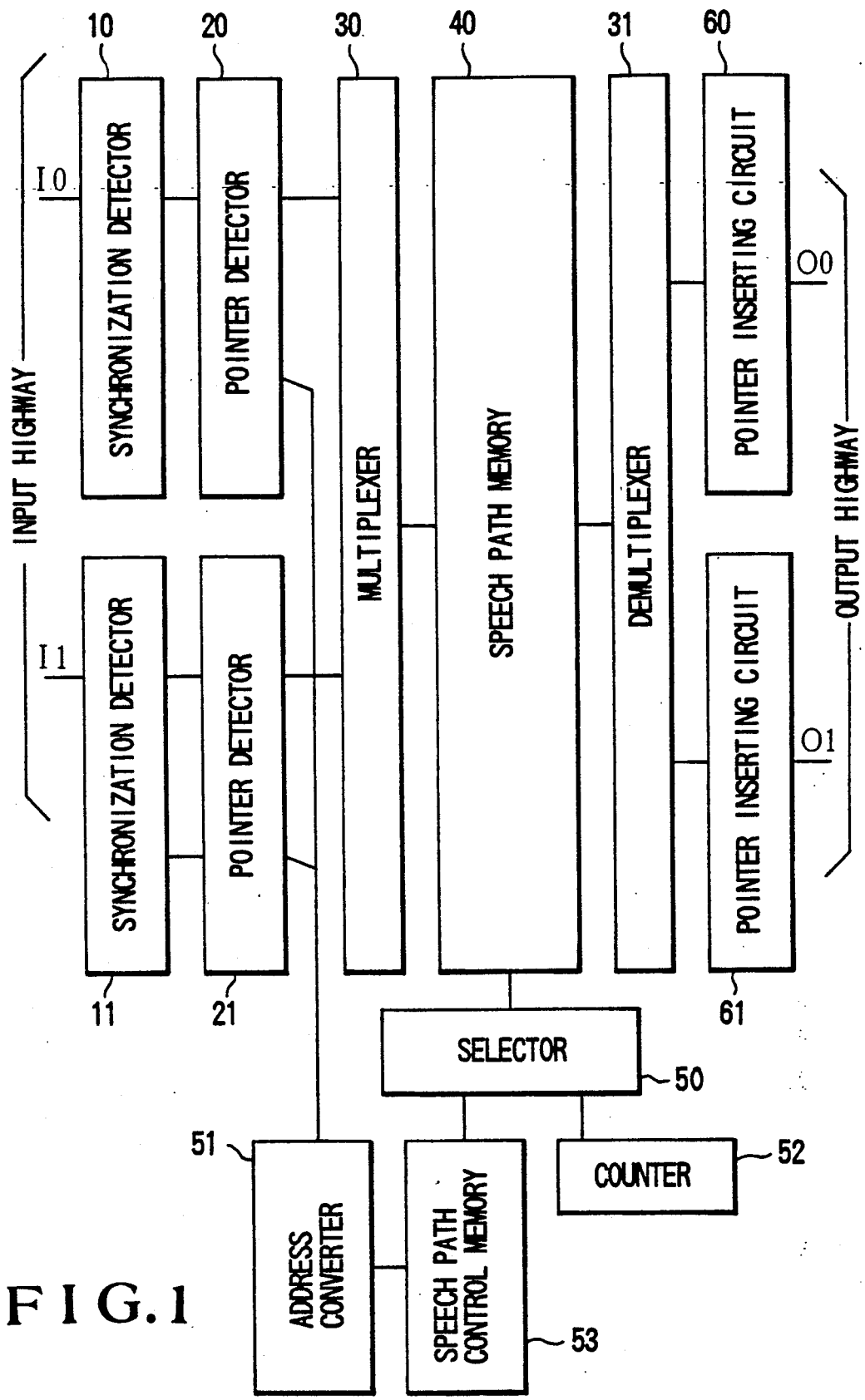
FIG. 1 is a block diagram showing a time division speech path apparatus according to an embodiment of the present invention.

FIG. 1 shows an embodiment of the present invention. Transmission data from input highways $I_0$ and $I_1$ are multiplexed by a multiplexer 30 through frame synchronization detectors 10 and 11 and pointer detectors 20 and 21. The multiplexed data are sequentially written in a speech path memory (SPM) 40 in accordance with data as addresses read out from a speech path control memory 53. The frame synchronization detectors 10 and 11 supply detected frame phases of the input highways $I_0$ and $I_1$ to the pointer detectors 20 and 21, respectively. The pointer detectors 20 and 21 respectively detect differences between the frame phases and the system phase and pointer values and acknowledge them to an address converter 51. The address converter 51 converts sequential addresses, which are sequentially generated in accordance with the system phase, into addresses in accordance with the frame phases of the input highways and the pointer value, and supplies them to a speech path control memory 53. The speech path control memory (SCM) 53 is a memory in which data corresponding to speech paths are written. Data is read out from the speech path control memory 53 by using data read out from the address converter 51 as an address. This data is then provided as a read address for the speech path memory 40. A selector 50 is a circuit for selecting either a write address or a read address, and is equivalent to a circuit having the same function in a conventional time division speech path apparatus. A counter 52 is operated in accordance with the system phase or a different read phase. Data which are read out from the speech path memory in accordance with sequential addresses generated by the counter 52 are separated by a demultiplexer 31. The pointer values of the separated data are set by pointer inserting circuits 60 and 61, and the data are then output to output highways $O_0$ and $O_1$.

Figure 2:
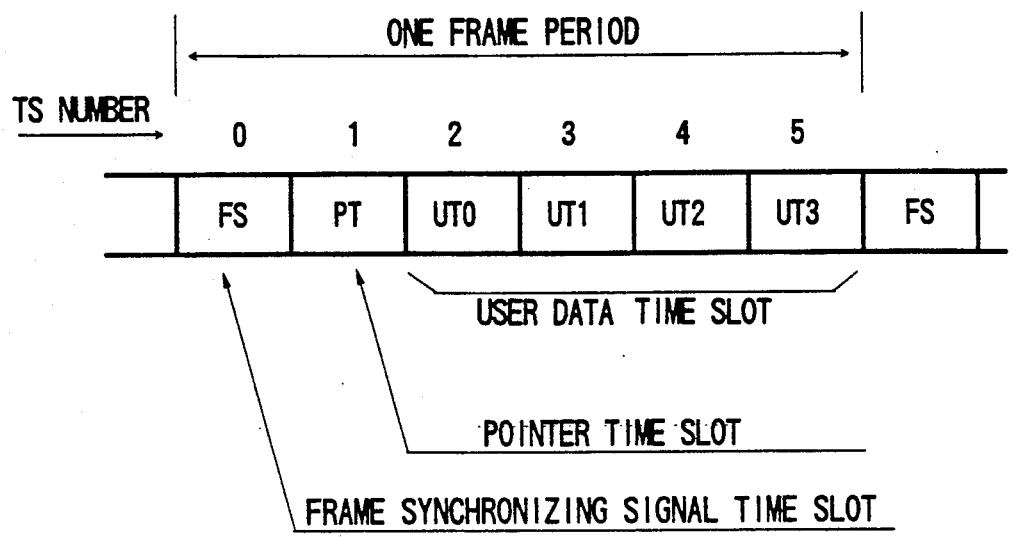
FIG. 2 shows a data format showing a time slot arrangement of one frame period.

FIG. 2 shows a highway format indicating time slot assignment in an input/output highway. In this embodiment, in a highway, one frame period is constituted by six time slots of time slot (TS) numbers 0 to 5. A time slot $TS_0$ is used to store a frame synchronizing signal (FS). A time slot $TS_1$ is used to store a pointer (PT). Time slots $TS_2$ to $TS_5$ are respectively used to store user data ($UT_0$ to $UT_3$). Four channels, i.e., a channel 0 ($CH_0$) to a channel 3 ($CH_3$) are stored in user data channels. The pointer (PT) indicates a specific time slot number at which the channel $CH_0$ is stored.

Figure 3:
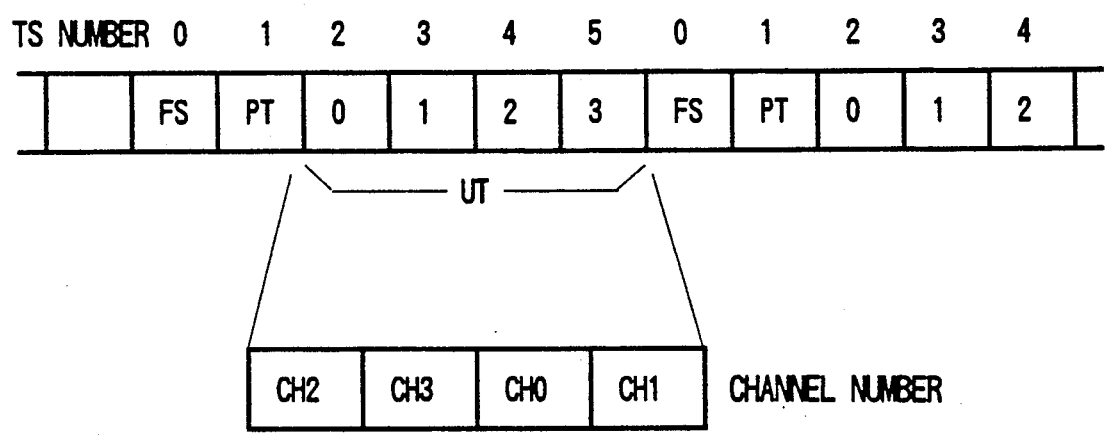
FIG. 3 shows a data format on the highway in FIG. 2.

FIG. 3 shows a format exemplifying an input/output highway. In this format, the pointer (PT) value is 4 and hence indicates that the channel $CH_0$ is stored in the time slot $TS_4$ (i.e., $UT_2$), and the channels $CH_1$, $CH_2$, and $CH_3$ are repeatedly stored in $UT_3$, $UT_0$, and $UT_1$.

Figure 4:
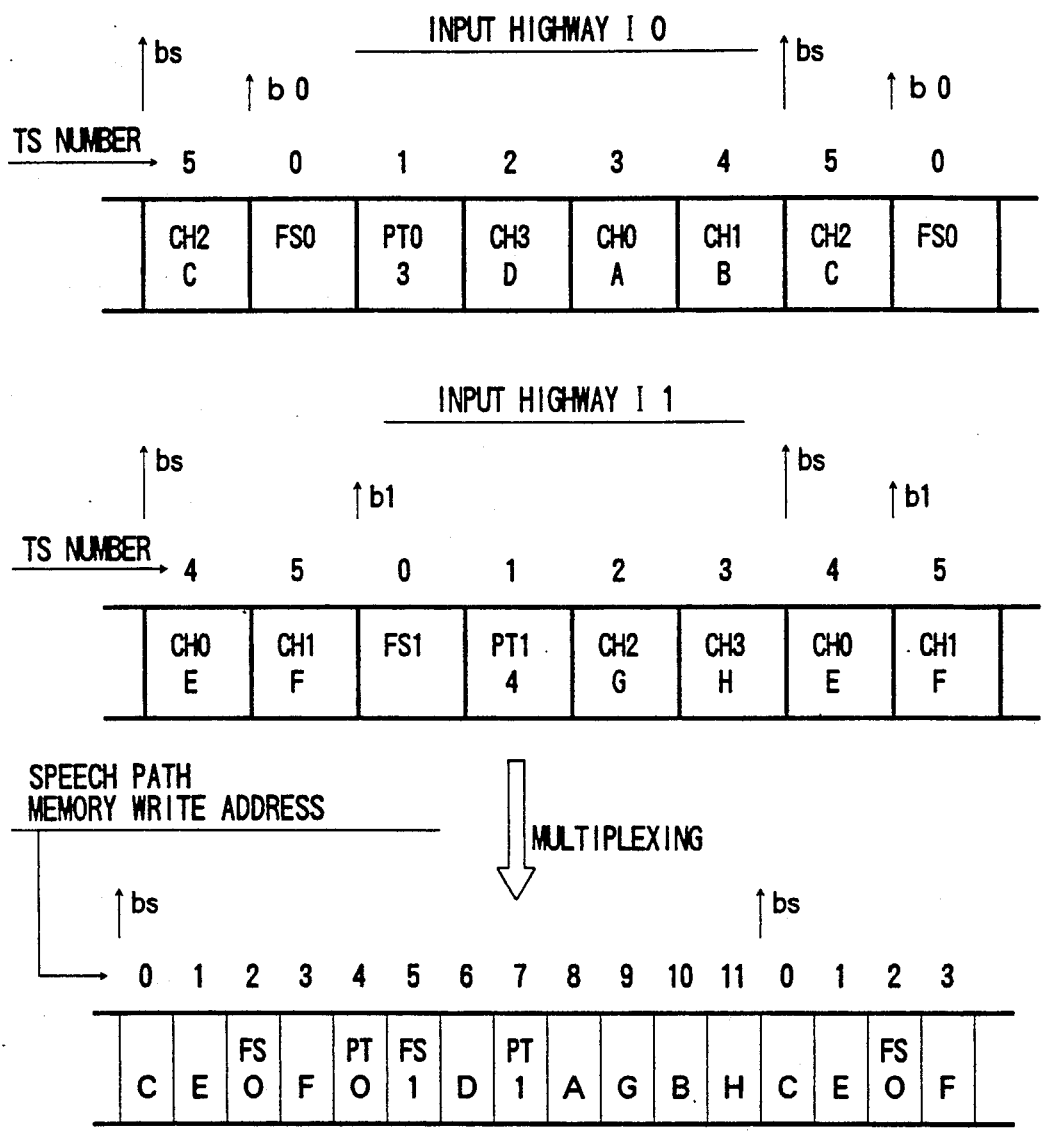
FIG. 4 shows data formats indicating a relationship between data and addresses in a multiplexing step.

FIG. 4 shows frame formats of outputs from the frame synchronization detectors 10 and 11 to the multiplexer 30 in the input highways $I_0$ and $I_1$, exemplifying a relationship between the input highways and multiplex operations. Byte phases of data which are input from the input highways to the frame synchronization detectors 10 and 11 at different phases are synchronized so as to match the byte divisions with each other. Phases b0 and b1 of the input highways are detected by the frame synchronization detectors 10 and 11, and a system phase bs is set by the multiplexer 30. Referring to FIG. 4, the input highways $I_0$ and $I_1$ respectively have pointer values of 3 and 4. The channels $CH_0$ to $CH_3$ of the input highway $I_0$ are used to send data A to D, and the channels $CH_0$ to $CH_3$ of the input highway $I_1$ are used to send data E to H. The pointer detectors 20 and 21 respectively detect a phase difference of one byte and a pointer value of 3 from the input highway $I_0$, and a phase difference of two bytes and a pointer value of 4 from the input highway $I_1$, and output them to the multiplexer 30. The multiplexer 30 sequentially and repeatedly forms inner formats to be output to the speech path memory 40 as data C E, $FS_0$, data F, $PT_0$, $FS_1$, data D, $PT_1$, data A G B H with respect to write addresses 1 to 11 of the speech path memory. In this case, numerals 0 and 1 respectively indicate the input highways $I_0$ and $I_1$.

FIG. 5 is a table showing a relationship between SPM addresses of the speech path memory, at which the contents in the respective time slots of the multiplexed highway are written, and read addresses (SCM addresses) used to read out SCM data from the speech path control memory. The table shown in FIG. 5 is based on the arrangements shown in FIGS. 1 to 4. As shown in FIG. 5, the SCM addresses correspond to the time slot (TS) numbers on the multiplexed highway when a pointer value of 2 is set, i.e., the frame phase of each input highway is the same as the system phase. For example, TS0 of the multiplexed highway corresponds to TS2 (data C) of the input highway $I_0$. If, however, the input highway $I_0$ has the same frame phase as the system phase, and the pointer value is 2, TS2 of the input highway is arranged at the position of TS2 on the multiplexed highway. This number is used as an SCM address. An SCM address can be uniquely calculated on the basis of the frame phases and pointer values of the input highways. In other cases except for the above-described case, a relationship between the TS numbers of the multiplexed highway and SCM addresses can be easily defined.

FIG. 6 is a table showing a relationship between addresses and data of the speech path control memory (SCM) in relation to FIGS. 1 to 5, which corresponds to speech path connecting data. Referring to FIG. 6, a relationship between SCM addresses and the input highways is determined by the TS numbers of the multiplexed highway when a pointer value of 2 is set, i.e., the frame phase of each input highway is the same as the system phase. This relationship is represented as follows:

$SCM$ address = ($TS$ number set on input highway when pointer value of 2 is set (format in which channel 0 is arranged in time slot 2) $\times$ 2) + input highway number For example, SCM address=5 corresponds to $CH_0$ of the output highway $O_1$. A relationship between SCM data and an input highway is determined by a specific channel of the input highway to be connected to the corresponding channel of the output highway, and is obtained as speech path connecting data as follows:

$SCM$ data = ($TS$ number on output highway obtained when pointer value is 2 $\times$ 2) + output highway number (in this case, calculations are always performed on the assumption that the pointer value is 2). For example, in this embodiment, speech path setting is performed to connect the input highway $I_1$ $CH_3$ (SCM data 11) to the output highway $O_1$ $CH_0$ (SCM address 5).

FIG. 7 is a table showing a relationship between SCM data and SPM addresses based on the arrangements shown in FIGS. 1 to 6. Since the relationship between the multiplexed highway and the SPM addresses can be uniquely determined when the pointer values of the input highways can be obtained as shown in FIG. 5, the relationship between the SPM addresses and the SCM data can be established as shown in FIG. 7 on the basis of the relationship between the input highways and the SCM data shown in FIG. 6. That is, multiplexed highway TS0 (data C) corresponds to SCM address 8 SCM data 10. In this case, since SCM data is provided as an SPM address, data C is written as SPM data at an SPM address 10. Speech path connecting data is determined regardless of the phase and pointer value of each input highway, and is designated by a channel number. In contrast to this, an SCM address provided when data is to be written in a time slot of the multiplexed highway is determined by a calculation based on the actual phase and pointer value of each input highway. A speech path apparatus can be set without actual frame phases and pointer values.

Even if the phase and pointer value of each input highway differ from those in this embodiment, the relationship between SCM addresses and the time slot numbers of the multiplexed highway can be uniquely determined and can be easily obtained.

Figure 8:
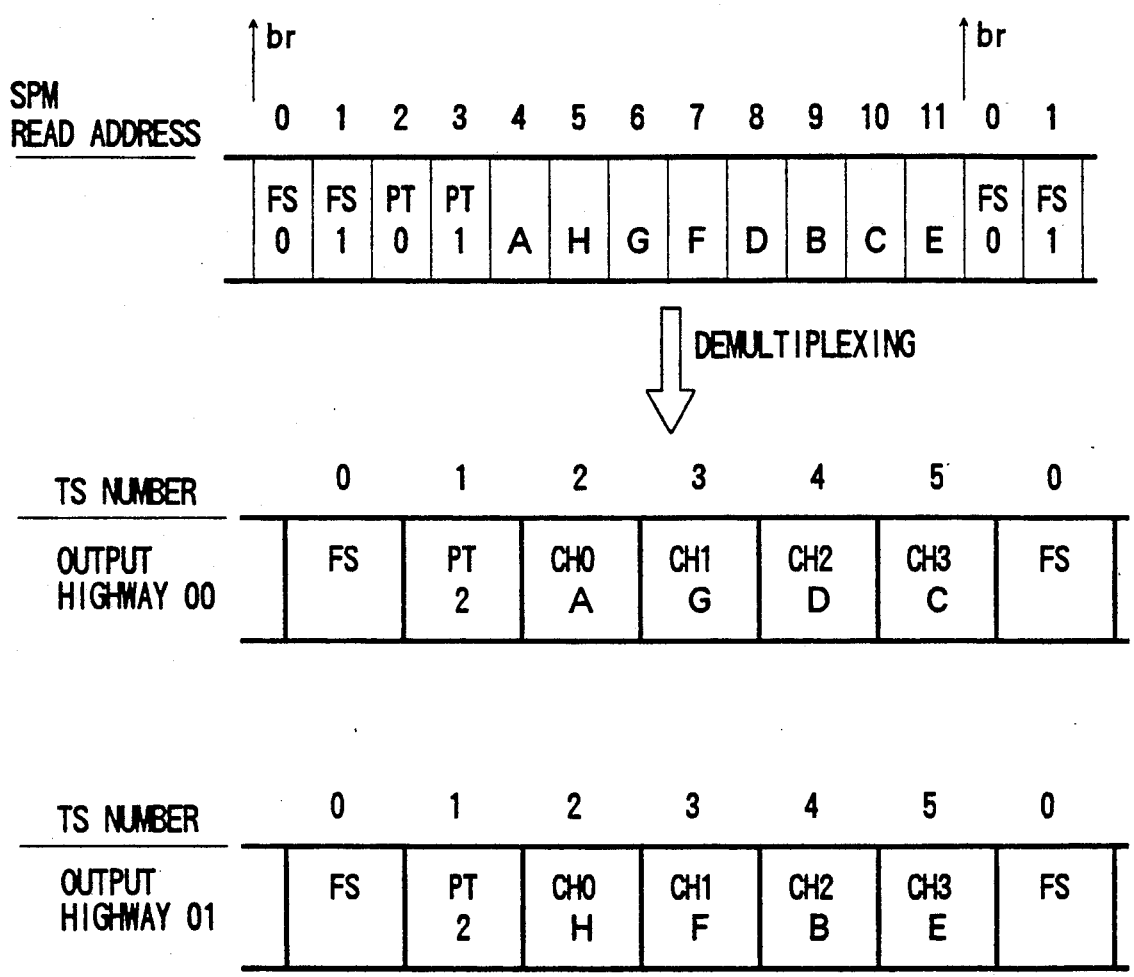
FIG. 8 shows data formats in a demultiplexing step in relation to FIGS. 1 to 7.

FIG. 8 is a frame format showing data read out from the speech path memory 40 on the basis of the data shown in FIGS. 1 to 7, and data on the output highways $O_0$ and $O_1$ obtained by demultiplexing the read data by using the demultiplexer 31. Addresses which are used to read out data from the speech path memory 40 are provided by the counter 52 for sequentially generating sequential addresses in accordance with a read phase br independent of a system phase bs. Data which are read out from the speech path memory 40 in accordance with these sequential addresses respectively correspond data $FS_0$, $FS_1$, $PT_0$, $PT_1$, A, H, G, F, D, B, C, and E at read addresses 0 to 11. Since data is read out from the speech path memory 40 at the phase br independent of the system phase bs, the phases bs and br may be set to be different from each other. Data corresponding to the read addresses for the speech path memory 40 are demultiplexed and assigned to the output highways $O_0$ and $O_1$ in units of bytes by the demultiplexer 31. In the demultiplexer 31, the pointer value of each input highway is left as the pointer value of each output. In this embodiment, however, since $CH_0$ is stored in TS2 (UT0) on each of the output highways $O_0$ and $O_1$, the pointer inserting circuits 60 and 61 set a pointer value of 2 so as to format a frame. That is, as shown in FIG. 8, a pointer value of 2 is commonly set in the output highway $O_0$ and $O_1$, and the data group A, G, D, and C, and the data group H, F, B, and E are respectively output to the channels $CH_0$ to $CH_3$ of the respective output highways. In this embodiment, as is apparent from the channel data, the speech path control memory 53 performs time slot switching in accordance with the speech path connection data. That is, input highway $I_1 \cdot CH_3$ is replaced with output highway $O_1 \cdot CH_0$ (data H).

It is easily estimated that even an arrangement similar to the arrangement in this embodiment can be used even if the number of highways and the number of slots are different from those in the embodiment.

As has been described above, according to the time division speech path apparatus of the present invention, pointers are set on highways so that a relationship between the time slots on the highways and read addresses for the speech path control memory is determined on the basis of the frame phases and pointer values of the respective highways. Data which are read out from the speech path control memory in accordance with addresses based on this relationship are written in the speech path memory as read addresses therefor. In addition, sequential addresses generated by the counter operated in accordance with the specific read phase of the system are provided to the speech path memory as read addresses therefor. With this arrangement, time division switching of a plurality of input highways having different phases can be performed without using a buffer memory for matching the frame phases of the input highways. This prevents an increase in delay time and hardware amount due to buffer memories.

What is claimed is:

1. A time division speech path apparatus, having time division highways with input highways having different frame phrases, for performing time division switching between time slots of the input highways and output highways, the apparatus comprising:

a multiplexer for the time division highways;

a speech path memory connected to said multiplexer;

a speech path control memory;

a frame synchronization detector connected to the input highways for detecting frame positions, also called highway frame phases herein, on data formats of the respective input highways and synchronizing byte phase divisions between the input highways, each of the data formats being constituted by a pointer consisting of at least one byte representing a time slot position at which a first channel of user data on a corresponding one of the time division highways is stored, and a plurality of time slots for carrying a plurality of user data;

a pointer detector connected to said frame synchronization detector for holding a difference between a highway frame phase from said frame synchronization detector and a system frame phase of said speech path independent of a frame phase of the input highways to which a system of said speech path is internally generated or externally supplied and a pointer value read out from contents of the pointer of each of said input highways;

a pointer inserting circuit for writing pointer values in pointers on said output and input highways;

an address converter connected to said pointer detector and also connected to said speech path control memory for converting sequential addresses sequentially generated in accordance with the system frame phase, into data on the basis of detected frame phrases and pointer values, and outputting the data as addresses for said speech path control memory;

a selector for selecting data, which are read out from said speech path control memory by using the outputs from said address converter as addresses, during a write mode of said speech path memory so as to provide the data as addresses to said speech path memory, sequentially writing data obtained by multiplexing data from said input highways in said speech path memory in accordance with the addresses, and selecting sequential addresses, which are sequentially generated by a counter in accordance with a frame phase independent of the system frame phase, during a read mode of said speech path memory so as to provide the sequential addresses to said speech path memory as addresses; and a demultiplexer for sequentially reading out contents from said speech path memory, demultiplexing the read contents, and outputting the demultiplexed data to said output highways.

* * * * *